United States Patent Office 3,462,372
Patented Aug. 19, 1969

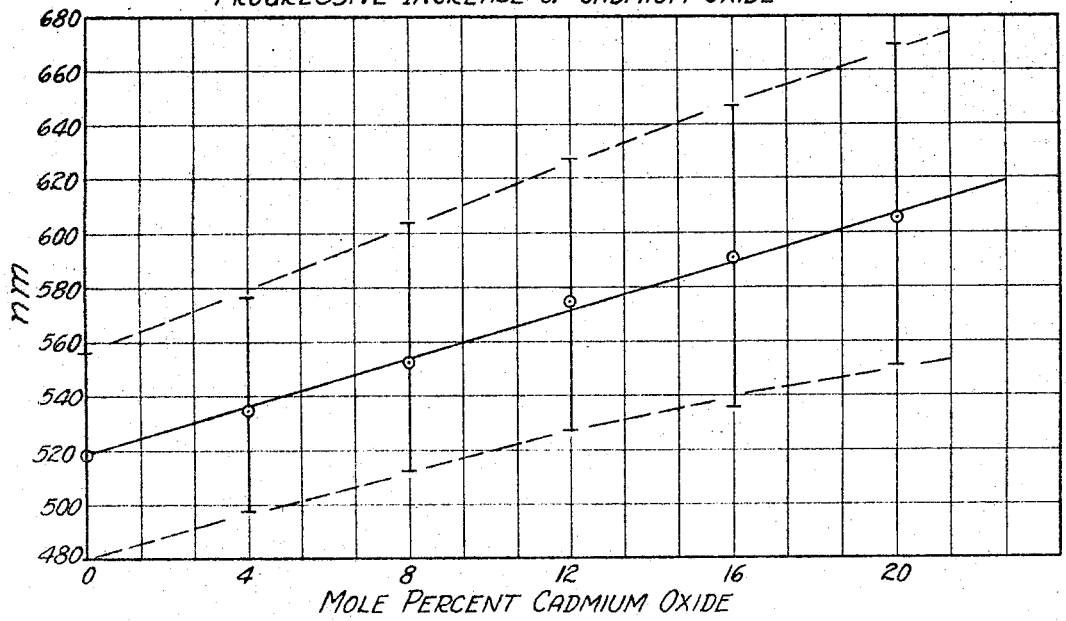
Fig. 1. PEAK AND HALF-BAND WITH PROGRESSIVE INCREASE OF CADMIUM OXIDE
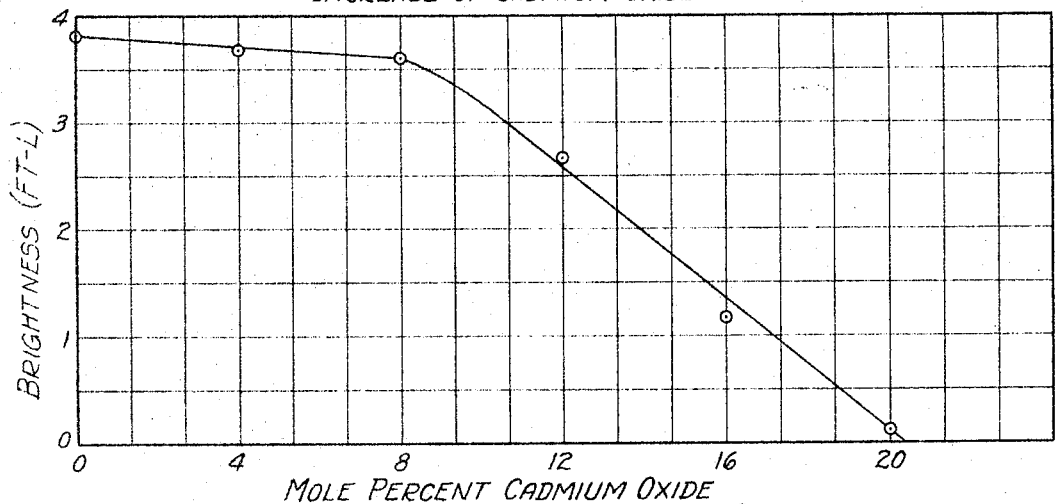
Fig. 2. BRIGHTNESS WITH PROGRESSIVE INCREASE OF CADMIUM OXIDE
Inventor:
Ivie L. Smith
by Richard H. Burgess
Her Attorney

3,462,372
METHOD FOR PRODUCING ELECTROLUMI-
NESCENT ZINC-CADMIUM SULFIDE-OXIDE
PHOSPHORS
Ivie L. Smith, Cleveland, Ohio, assignor to General
Electric Company, a corporation of New York
Filed July 25, 1966, Ser. No. 567,518
Int. Cl. C09k 1/12
U.S. Cl. 252—301.6                                    6 Claims

ABSTRACT OF THE DISCLOSURE

Zinc-cadmium sulfide-oxide phosphors activated by copper and halides can be most effectively produced by firing a batch of zinc sulfide containing the activators and mixed with copper sulfide and cadmium oxide, and then removing the excess reactants.

---

This invention relates to electroluminescent phosphors and more particularly to electroluminescent zinc-cadmium sulfide-oxide phosphors and to a method for their preparation.

Electroluminescent phosphors may be used in electroluminescent lamps or cells wherein a thin layer of phosphor which may be dispersed in a suitable dielectric medium is sandwiched between a pair of conducting plates at least one of which transmits light. The lamp is in the nature of a luminous capacitor, and when an alternating voltage is applied across the plates, the phosphor emits light which escapes through the transparent plate.

It is well known that copper-activated zinc sulfide phosphors can be made with electroluminescent emission peaking at wavelengths between 460 and 520 nanometers (nm.), generally from blue to green colors. One nanometer equals ten angstrom units. Also known is copper and manganese-activated zinc sulfide phosphor with electroluminescent emission peaking at 580 nm., generally a yellow or gold color. For many lighting applications, the particular color effects of the regions between 520 and 580 nm., and longer than 580 nm. are desirable. Attempts to fill the color gaps by introducing either cadmium or selenide into copper-activated zinc sulfide have been successful insofar as the desired spectral properties are concerned but electroluminescent outputs have been very poor.

Accordingly, the general object of this invention is to provide novel and efficient electroluminescent phosphors which have emissions peaking between 520 and 590 nm., with good brightness.

It is another object to provide a method for preparing such phosphors having emissions peaking between 520 and 590 nm., with good brightness.

Other objects and advantages of the invention will appear from the following description of species thereof and from the accompanying drawing.

In accordance with the aforesaid objects, I have provided copper-activated zinc-cadmium sulfide-oxide phosphors. Suitable coactivators may be used. Also, the peak of the emission of copper-activated bromide-coactivated zinc sulfide phosphors can be changed to any point between 520 and 605 nm. This is accomplished by mixing the copper-activated bromide-coactivated phosphor with from 0.25 to 1.75 weight percent copper sulfide and from 1 to 20 mole percent cadmium oxide and firing the mixture in a neutral atmosphere at a temperature of from 600° C. to 800° C. for at least one-half hour. The resulting mixture is then washed to remove excess compounds from the product.

The resulting products are best described by reference to the accompanying drawing. FIG. 1 illustrates graphically the spectral properties with variable cadmium oxide for preferred phosphors of the invention which have been prepared according to the method of the invention. A progressive increase of cadmium oxide in the prescribed mixture produces broadening of the emission band (dashed lines) and changes the peak of the emission to longer wavelengths (solid lines).

The change of the emission peak from 520 to 550 nm. (0 to 8 mole percent cadmium oxide) is accomplished without significant loss in brightness as shown in FIG. 2. The change of the emission peak from 550 to 605 nm. is accompanied by loss in brightness but outputs are good out to 590 nm. peak for about 16 mole percent cadmium oxide and may be useful for some applications from there out to a 605 nm. peak with 20 mole percent cadmium oxide.

The properties and compositions of the copper-activated bromide-coactivated zinc sulfide influence the brightness and spectral nature of the cadmium oxide diffused products. The copper-activated bromide-coactivated zinc sulfide may be prepared by a variety of known methods but best results are obtained with phosphor prepared according to the method described in pending application of I. L. Smith, Ser. No. 310,668, filed Sept. 23, 1963, now abandoned but claimed for priority in Patent 3,374,179—Smtih, issued Mar. 19, 1968 which is based on a continuation-in-part of said application. The continuation-in-part patent application was filed Apr. 10, 1967 and had Ser. No. 633,665. The preferred electroluminescent intermediate phosphor for production of phosphor of the invention for operation at 60 cycles per second (c.p.s.) is prepared by mixing together finely divided zinc sulfide, cuprous bromide in the amount of $3.5 \times 10^{-3}$ moles per mole of zinc sulfide, and antimony trioxide as a fluxing agent in the amount of $3.4 \times 10^{-6}$ moles per mole of zinc sulfide. Modifications to this formulation may be found desirable for operation at other frequencies. For example, for 400 c.p.s. operation, the amount of antimony trioxide should be increased by 2 to 8 fold in the intermediate formulation. This admixture is fired in a neutral atmosphere at a temperature of 920° C. for 2 hours. The product may be used as obtained for the preparation of the zinc-cadmium sulfide-oxide phosphor but is desirably washed free of excess compounds in the usual fashion known in the art in dilute acid and in dilute cyanide solution.

The electroluminescent intermediate phosphor used for producing the electroluminescent phosphors of the invention can be described as ZnS:CuX, wherein X is at least one halide selected from the group consisting of Cl and Br.

Electroluminescent phosphors of the invention have the general formula:

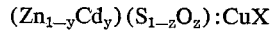

wherein y is between about 0.20 and a small but effective amount to cause a color shift in the phosphor, z is approximately equal to y, Cu is provided in activator proportions, and X is at least one halide selected from the group consisting of Cl and Br and is approximately equal in molar amount to the Cu content. Separate embodiments of these phosphors have y and z about from 0.01 to 0.08 and about from 0.08 to 0.20. In preferred embodiments of the invention, Cu activator is present in the range of about $2.8 \times 10^{-3}$ to $3.5 \times 10^{-3}$ moles per mole of phosphor.

Since the effect of cadmium oxide additions is a progressive and apparently continuous increase in color change, the lower limit of y and z in the general formula cannot be specified precisely. Therefore, it is stated to be a small but effective amount to cause a color shift in the phosphor, meaning a color shift having utility sufficient to cause such a phosphor to be selected for use instead of a phosphor wherein y and z are zero. Also, molar proportions of cadmium and oxygen in the phosphor are preferably approximately equal for best results. Some variance between y and z can be tolerated with the resulting phosphors still being equivalent to phosphors of the invention.

The preparation of electroluminescent copper-activated zinc sulfide phosphor requires the presence of a coactivating agent to achieve good particle growth, brightness, and maintenance. Common coactivating agents are the monovalent anions—for example, chloride and bromide—and the trivalent cations—for example, aluminum. Any of the known coactivating agents may be incorporated in the copper-activated zinc sulfide phosphor used for cadmium oxide diffusion but I have found that brightness of the copper-activated zinc-cadmium sulfide-oxide phosphors can be as much as twice as great with bromide coactivator as with the other known coactivators. For example, the 60 c.p.s. brightness curve in FIG. 2 for the bromide-coactivated phosphor has a plateau followed by a drop with cadmium oxide additions above 8 mole percent. The brightness curve for the chloride-coactivated phosphor is not shown in the graph but it begins to drop significantly immediately on addition of cadmium oxide. Phosphors on the plateau are more efficient, but phosphors having more cadmium oxide have different colors, containing more red which is desirable for some applications. For economical preparation and the desired light production characteristics, chloride and bromide coactivators are used, and bromide coactivation is preferred.

Fine particle copper sulfide is desirable in the admixtures, acting partly as a catalyst, for diffusing cadmium oxide into copper-activated zinc sulfide to make these phosphors. It reduces brightness loss and promotes the diffusion of the cadmium oxide into the phosphor particles. Either cuprous or cupric sulfide may be used but the cupric sulfide is preferred. Other compounds of copper than sulfide may be used—for example, cupric oxide—but the results are not as good as those obtained with the sulfides. The amount of cupric sulfide needed is not highly critical. Results are better if some adjustment in the amount of copper sulfide is made in relation to the mole percent cadmium oxide used. Preferred amounts are 0.75 weight percent copper sulfide in admixtures containing 1 to 12 mole percent cadmium oxide and 1.50 weight percent in admixtures containing 13 to 20 mole percent cadmium oxide.

Copper-activated zinc-cadmium sulfide electroluminescent phosphors prepared by diffusion of cadmium sulfide into a copper-activated zinc sulfide have been reported as in Patent 2,968,627—Wachtel. Such phosphors are not as bright and do not have as favorable spectral properties as phosphors prepared with cadmium oxide as the spectral modifying agent in accordance with the present invention. In addition, the products of cadmium oxide diffusion are more friable and more uniform than the products of cadmium sulfide diffusion.

The firing may be done by placing the mixture consisting of the preferred electroluminescent copper-activated bromide-coactivated zinc sulfide intermediate phosphor, cupric sulfide, and cadmium oxide in the inner one of a pair of close fitting silica tubes, the inner tube being inserted open end foremost within the outer. This arrangement effectively prevents diffusion of air into the firing vessel. Other containers could be used, provided any ambient oxygen-containing atmosphere is effectively excluded. A firing temperature of 700° C. is preferred and the duration of the firing time will depend on temperature and the batch size of material being prepared. The firing time must be long enough to allow for diffusion of the cadmium oxide into the phosphor for the formation of the desired electroluminescent phosphor, and will generally be one-half hour or more.

After cooling to room temperature, the electroluminescent phosphor is washed free of excess reactants and other compounds. For instance, it may be washed in acetic acid solution to remove free zinc oxide and then rinsed thoroughly with deionized water. Next it may be washed in potassium cyanide solution to remove free copper compounds and again rinsed thoroughly with deionized water. It may then be dried at a low temperature of about 110° C. to complete the preparation.

Specific examples of suitable phosphors in accordance with the prescribed composition and method follow.

Example 1

Eighteen grams of the preferred copper-activated bromide-coactivated zinc sulfide phosphor, 2.00 grams of cadmium oxide, and 0.15 gram of cupric sulfide are mixed by sifting through 150—mesh silk sieve cloth. The mixture is then placed in the inner one of two telescoping silica tubes as previously described and fired for 2 hours at 700° C. in air. The product is washed in successive steps with acetic acid solution, water, potassium cyanide solution, and water. The preparation is completed by drying at 110° C.

Under electroluminescent excitation in dry chlorinated biphenyl (Aroclor, described in publication O–P 115 of Monsanto Chemical Company) at 60 volts (root-mean-square, RMS) per mil, the phosphor gives a brightness of 1 foot-lambert with 553 nm. peak at 60 c.p.s., 7 foot-lamberts with 543 nm. peak at 475 c.p.s., and 32 foot-lamberts with 535 nm. peak at 5100 c.p.s.

Example 2

Sixteen grams of the preferred copper-activated bromide-coactivated zinc sulfide phosphor, 4.00 grams of cadmium oxide, and 0.30 gram of cupric sulfide are mixed, fired, washed, and dried as above.

Under electroluminescent excitation in dry chlorinated biphenyl at 60 volts (RMS) per mil, the phosphor gives a brightness of 0.4 foot-lambert with 590 nm. peak at 60 c.p.s., 2 foot-lamberts with 574 nm. peak at 475 c.p.s., and 10 foot-lamberts with 562 nm. peak at 5100 c.p.s.

What I claim as new and desire to secure by Letters Patent of the United States is:

1. A method for producing electroluminescent phosphor having the general formula:

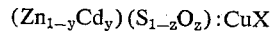

$$(Zn_{1-y}Cd_y)(S_{1-z}O_z):CuX$$

wherein y is between about 0.20 and a small but effective amount to cause a color shift in the phosphor, z is approximately equal to y, Cu is provided in activator proportions, and X is at least one halide selected from the group consisting of Cl and Br and is approximately equal in molar amount to the Cu content, said method including the following steps:
  (a) mixing together to form a batch: electroluminescent ZnS:CuX intermediate phosphor, wherein X is at least one halide selected from the group consisting of Cl and Br, with copper sulfide and cadmium oxide in amount of about 0.25 to 1.75 weight percent copper sulfide and about 1 to 20 mole percent cadmium oxide, both relative to the total batch,
  (b) firing said batch at elevated temperatures for a time sufficient to form said electroluminescent phosphor, and
  (c) removing excess reactants and other compounds from said electroluminescent phosphor.

2. The process of claim 1 in which about 0.75 weight percent copper sulfide and about 1 to 12 mole percent cadmium oxide are used in step (a).

3. The process of claim 1 in which about 1.50 weight percent copper sulfide and about 13 to 20 mole percent cadmium oxide are used in step (a).

4. The process of claim 1 in which the firing of step (b) is performed at a temperature in the range of about 600 to 800° C. for a time in the range of at least about one-half hour.

5. The process of claim 3 in which the firing of step (b) is performed at a temperature of about 700° C. for at least about one-half hour.

6. The process of claim 3 in which the copper sulfide used in step (a) is cupric sulfide.

References Cited

UNITED STATES PATENTS

| | | |
|---|---|---|
| 2,821,509 | 1/1958 | Hunt et al. |
| 2,919,250 | 12/1959 | Butler et al. |
| 2,950,257 | 8/1960 | Froelich. |
| 2,968,627 | 1/1961 | Wachtel. |
| 3,140,999 | 7/1964 | Lehmann. |

TOBIAS E. LEVOW, Primary Examiner

R. D. EDMONDS, Assistant Examiner